United States Patent [19]

Sobottke et al.

[11] Patent Number: 5,465,493
[45] Date of Patent: Nov. 14, 1995

[54] PIPE ALIGNMENT APPARATUS AND METHOD USING GREEN LIGHT

[75] Inventors: Mark D. Sobottke, Kettering; Daniel R. Klemer, Dayton, both of Ohio

[73] Assignee: Spectra-Physics Laserplane, Inc., Dayton, Ohio

[21] Appl. No.: 253,073

[22] Filed: Jun. 2, 1994

[51] Int. Cl.$^6$ ............................ G01C 15/00; G01B 11/00
[52] U.S. Cl. .................. 33/286; 33/293; 33/DIG. 21; 356/399; 362/259
[58] Field of Search ............................. 33/286, 290, 293, 33/294, 295, DIG. 21; 362/259, 293; 356/138, 153, 399

[56] References Cited

U.S. PATENT DOCUMENTS

| | | | |
|---|---|---|---|
| 3,612,700 | 10/1971 | Nelson | 33/286 |
| 3,631,601 | 1/1972 | McNulty | 33/286 |
| 5,084,980 | 2/1992 | Skopec et al. | 33/286 |
| 5,095,629 | 3/1992 | Klemer et al. | 33/293 |
| 5,291,263 | 3/1994 | Kong | 356/153 |

*Primary Examiner*—Christopher W. Fulton
*Attorney, Agent, or Firm*—Killworth, Gottman, Hagan & Schaeff

[57] ABSTRACT

A pipe alignment system and method is provided for positioning a pipe line along a predetermined path. A light transmitter generates a reference light beam along which the pipe line is to be positioned. The light beam has wavelengths substantially in the green portion of the optical spectrum. An optical target is positioned at one end of each pipe section to assist in alignment thereof. Preferably, the optical target has a green tint which filters the green light from ambient light. The optical target may also have reference indicia thereon to assist in aligning the target with the reference beam of light.

20 Claims, 3 Drawing Sheets

PIPE ALIGNMENT APPARATUS AND METHOD USING GREEN LIGHT

BACKGROUND OF THE INVENTION

The present invention relates generally to laser-based pipe alignment systems which use a reference beam of light along a predetermined path to position sections of pipe and, more particularly, to a pipe alignment system and method wherein a reference beam of light in the green portion of the optical spectrum is aligned with an optical target inserted in a section of pipe as the position of the pipe is adjusted.

Systems employing a reference beam of laser light have been used in numerous surveying and construction applications. In particular, such systems have been advantageously used to lay sections of pipe. Typically, a laser beam transmitter provides a reference laser beam which is transmitted through the previously positioned pipe sections along a central axis. A laser beam target having reference indicia thereon is placed within a section of pipe to assist workers in positioning the pipe.

One such laser beam target is disclosed in commonly assigned, U.S. Pat. No. 5,095,629, the disclosure of which is hereby incorporated by reference. The end of the pipe opposite the laser beam target is aligned with the end of a previously laid pipe section. The newly laid pipe section is then maneuvered until the reference beam of light strikes the reference indicia on the target. Support material, such as gravel, is placed under the pipe section to support and hold the pipe section in place.

These prior pipe alignment systems have primarily employed gas or semiconductor lasers which emit light in the red portion of the light spectrum (approximately 630–700 nm). Consequently, laser beam targets have hitherto been designed for optimum detection of incident light in the red portion of the optical spectrum. A worker can then view an image of the light beam where it strikes the target and align this image with the reference indicia on the target.

Prior pipe alignment systems have experienced various problems associated with the use of light in the red portion of the optical spectrum. High power levels are needed to emit a red light beam with sufficient brightness to properly operate the system and be readily apparent to the human eye. Power levels which are too high can be hazardous to operators of the system. As is well known, various eye injuries can result from prolonged exposure to high powered laser beams. In view of the potential health hazards, federal and international regulatory and enforcement agencies have strictly regulated the construction and use of lasers. These regulations, although extremely beneficial to the health of laser users, severely restrict the maximum power of lasers which may be employed in pipe alignment systems. This, in turn, has limited the useful operating ranges of prior art alignment systems.

In addition, it has been found that the use of a red light beam restricts the useful range of pipe alignment systems. During propagation of a light beam, the diameter of the beam enlarges in proportion to both distance and wavelength due to inherent diffraction. Since red light has the longest wavelength of any visible light, it necessarily experiences a large amount of diffraction divergence over distance. Consequently, the alignment accuracy of a pipe alignment system using a red beam of light is limited by this enlargement of the light beam.

For the foregoing reasons, there is a need for a pipe alignment system and method utilizing a low powered light source which is operable over greater distances, and in which diffraction divergence is reduced to allow more accurate alignment of sections of pipe.

SUMMARY OF THE INVENTION

This need is met by the improved pipe alignment system and method of the present invention wherein a reference light beam having wavelengths substantially in the green portion of the optical spectrum is used to align the various sections of pipe. An optical target which has a green tint transparent to light having a wavelength substantially in the green portion of the optical spectrum is positioned in one end of the pipe section to assist in the alignment of the pipe.

In accordance with one aspect of the present invention, a pipe alignment system for aligning a section of pipe along a predetermined path is provided. A light transmitter transmits a collimated beam of light having a wavelength substantially in the green portion of the optical spectrum along the predetermined path. Generally, the light wavelengths in a green portion of the optical spectrum range from 510 to 570 nm. The light transmitter may include either a solid-state laser, a frequency-doubled solid-state laser, a gas laser, a helium-neon laser, a semiconductor laser or any laser which generates light substantially in the green portion of the optical spectrum. One particularly suitable laser, for example, is disclosed in U.S. patent application Ser. No. 08/253,072, entitled "SOLID STATE LASER" (attorney's docket number SPC 225 PA) by Sobottke, et al., concurrently filed herewith, the disclosure of which is hereby incorporated by reference.

An optical target is positioned at one end of the pipe section to provide a visual indication of impingement of the beam of light. The optical target may be constructed of a substantially transparent material having a green tint such that the material is substantially transparent to light in the green portion of the optical spectrum. The optical target may also have reference indicia thereon which is aligned with the light beam to position the pipe section. Preferably, the optical target includes a light diverter for directing a substantial portion of the beam of light in a direction toward a worker's position out of the path of the beam of light.

In accordance with another aspect of the present invention, a method is provided for positioning a pipe line having at least a first section of pipe along a predetermined path. The method comprises the steps of: positioning the first end of the first section of pipe along the predetermined path; positioning a light transmitter at the first end of the first section of pipe, the light transmitter generating a reference beam of light having wavelengths substantially in the green portion of the optical spectrum and propagating along the predetermined path; and aligning the second end of the first section of pipe in response to the reference beam of light.

Preferably, the method for positioning the pipe line comprises the step of positioning an optical target at the second end of the first section of pipe, the optical target having reference indicia thereon, and the step of aligning the second end of the first section of pipe comprises the step of aligning the reference indicia and the reference beam of light.

In addition, the method for positioning a pipe line may comprise the steps of: providing a second section of pipe having a first end and a second end; mating the first end of the second section of pipe with the second end of the first section of pipe; and aligning the second end of the second section of pipe based on the reference beam of light. The step of aligning the second end of the second section of pipe may further include the step of positioning an optical target at the second end of the second section of pipe, the optical target having reference indicia thereon, and the step of aligning the second end of the second section of pipe may comprise the step of aligning the reference indicia and the reference beam of light.

It is thus a feature of the present invention to provide a pipe alignment system and method utilizing a low powered light source which is operable over greater distances, and in which propagation diffraction, and thus beam size, is reduced to allow more accurate alignment of sections of pipe.

Other features and advantages of the invention will be apparent from the following description, the accompanying drawings and the appended claims.

DETAILED DESCRIPTION OF THE INVENTION

Figure 1:
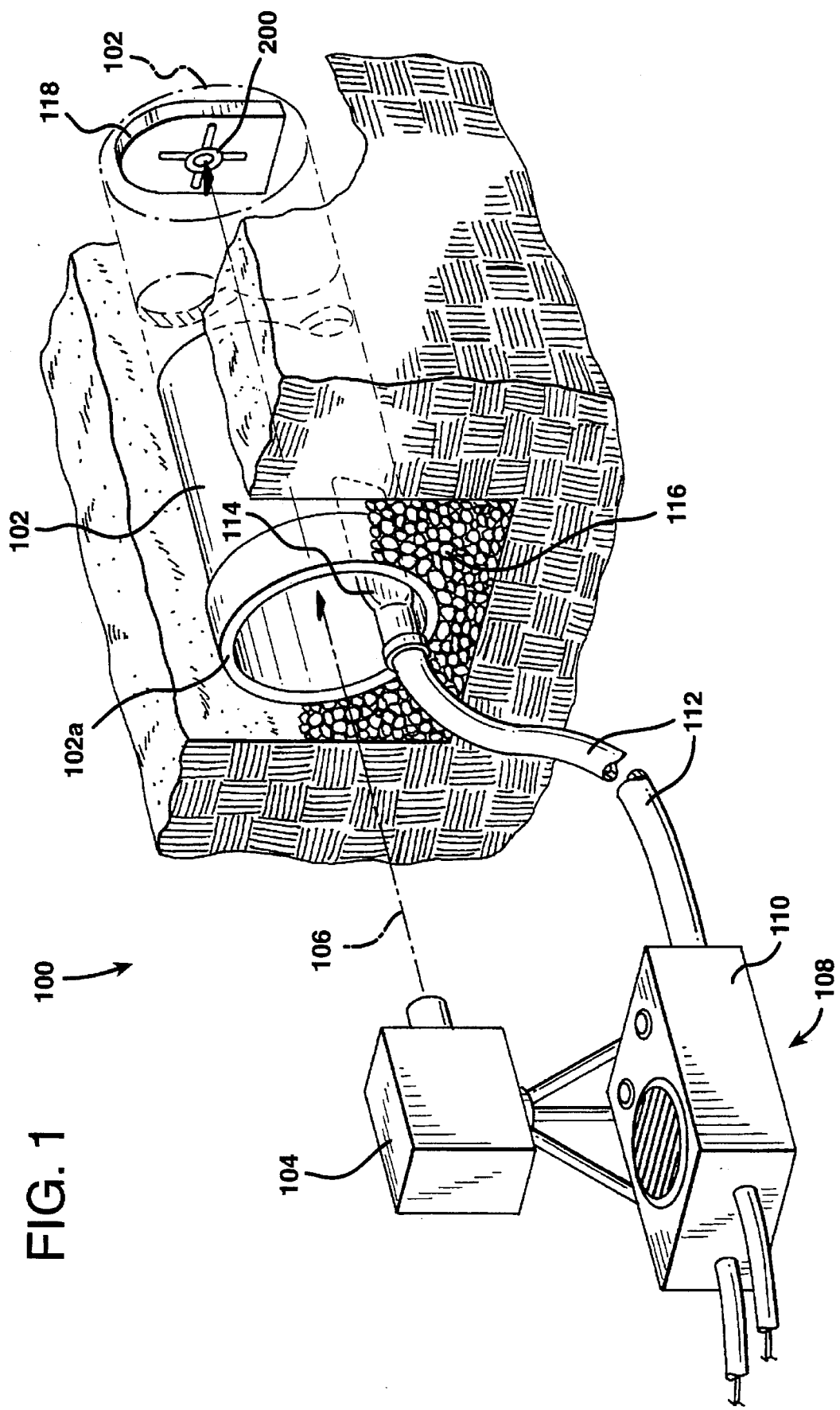
FIG. 1 shows a laser-based pipe alignment system including a light transmitter which generates a light beam having wavelengths substantially in the green portion of the optical spectrum and an optical target.

A pipe alignment system 100 is shown in FIG. 1 for aligning sections of pipe 102 along a predetermined path. A light transmitter 104 is positioned to transmit a collimated beam of light 106 along the predetermined path. An air blower assembly 108 located at one end of the pipe 102 circulates the air in the pipe 102 to reduce stratification of the air and the resulting refraction of the light beam 106. The air blower assembly 108 has a generator unit 110 which generates air flow in the section of pipe 102 via a flexible hose 112 and nozzle 114. Air blower assemblies are well known in the art and, therefore, will not be further described herein.

To increase accuracy and lower the necessary power levels, the light beam 106 generated by the light transmitter 104 has wavelengths substantially in the green portion of the optical spectrum. As is well known, the green portion of the optical spectrum generally includes the wavelengths from 510 nm to 570 nm. Since green light has a shorter wavelength than the commonly used red light, green light provides improved visibility and resolution. Such a light transmitter may be a frequency-doubled solid state laser, a gas laser such as a green HeNe laser or a semiconductor green laser diode. One solid-state laser which may be advantageously employed in the pipe alignment system of the present invention is disclosed in U.S. Pat. No. 4,884,281, issued to Hawthorn et al., the disclosure of which is hereby incorporated herein by reference.

Figure 3:
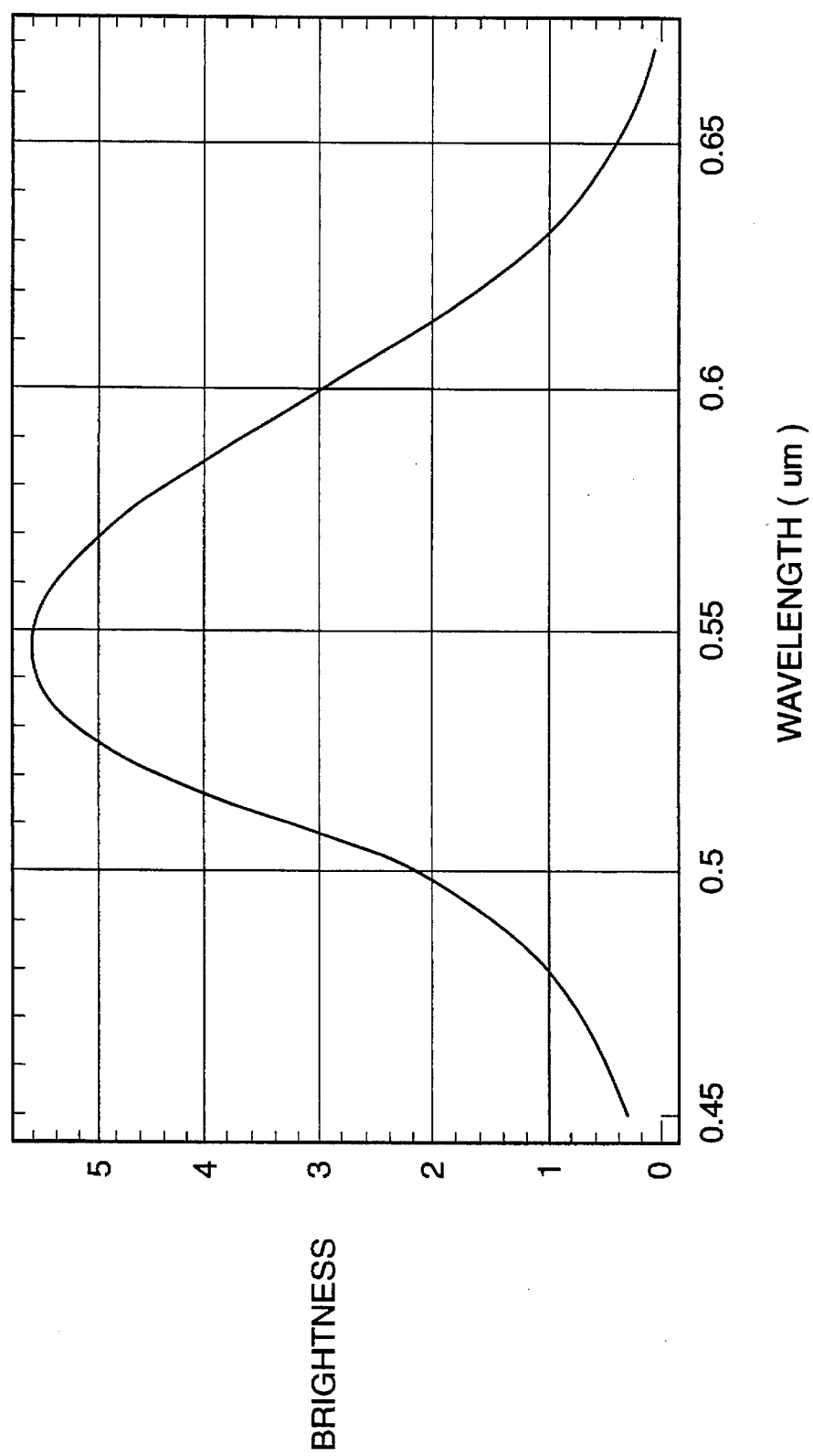
FIG. 3 is a graphical representation of the relationship between the visibility of a beam of light and the wavelength of the beam of light.

The relative response of the human eye to the visible wavelengths of light has been well documented. Generally, the overall brightness of a beam at working distances beyond the beam's Rayleigh range is given by the equation:

$$B(P,\lambda) = K \cdot P \cdot V(\lambda) \lambda^{-2}$$

wherein $V(\lambda)$ is the relative spectral response of the human eye, $\lambda$ is the beam wavelength, $K$ is a constant of proportionality and $P$ is beam power. A graphical representation of the relationship between visibility at distances and wavelength is shown in FIG. 3. The graph has been normalized such that the visibility (or brightness) of a laser with a wavelength of 633 nm (red) has a valve of 1. As is apparent from FIG. 3, a laser operating between 525 and 575 nm (green) requires approximately one-fifth the power of a laser operating at 633 nm (red) to appear equally as bright.

Reference is now made to FIG. 1. During positioning of the pipe section 102, a first end 102a of the pipe 102 is initially aligned along the predetermined path and secured in place by gravel 116 or other suitable material. An optical target 118 is positioned at a second end 102b of the pipe section 102 for visually indicating impingement of the light beam 106 thereon. The optical target 118 may be adapted to be inserted into end 102b of the pipe section 102. Preferably, the optical target 118 is constructed of a substantially transparent material having a green tint which is transparent to light having a wavelength substantially in the green portion of the optical spectrum to enhance the contrast of the green light against ambient light. Numerous methods for tinting transparent materials to filter particular wavelengths of light are well known in the art and, therefore, will not be further discussed hereinafter.

Figure 2:
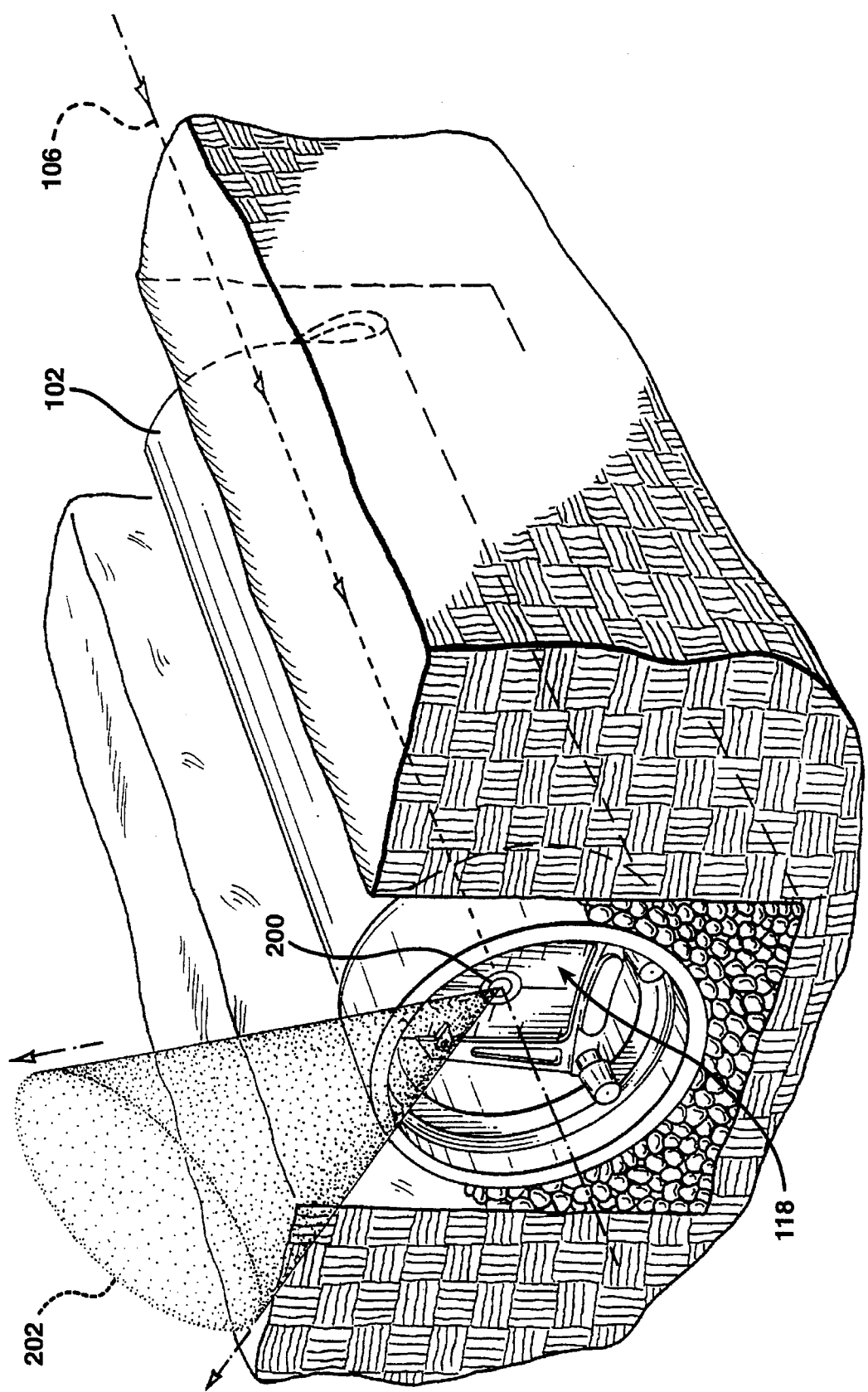
FIG. 2 is a perspective view of the optical target position in one end of a section of pipe.

As shown in more detail in FIG. 2, the optical target 118 preferably includes reference indicia 200 thereon which is aligned with the light beam 106 to position the pipe section 102. The optical target 118 may also include a light diverter for directing a substantial portion 202 of the beam of light 106 in a direction toward a worker's position out of the path of the beam of light 106, thereby permitting a worker viewing the target to more easily determine when the reference beam of light is in alignment with appropriate reference indicia on the target. For a complete description of the structure and philosophy of the optical target 118, one is directed to commonly assigned U.S. Pat. No. 5,095,629 which has been previously incorporated by reference.

When laying a pipe line, a worker initially places a first end of a first section of pipe in a predetermined position. Any of a number of well known methods may be used to initially position the first end of the first section of pipe in a predetermined position. For instance, sewer pipes are usually laid with reference to an outlet on an existing manhole. In this case, the first end of the first section of pipe is connected to the outlet. Alternatively, conventional surveying methods may be used to position the first end of the first pipe section. Once positioned, the first end is secured by an appropriate support material, such as gravel.

The light transmitter 104 is then positioned at the first end 102a such that the generated reference light beam 106 having wavelengths substantially in the green portion of the optical spectrum propagates along the predetermined path. The second end 102b of the first section of pipe 102 is aligned based on the reference light beam 106. To facilitate the positioning of the second end 102b of the pipe 102, the optical target 118 may be inserted into the second end 102b to provide a visual indication of the exit position of the light beam. After being properly positioned, the second end 102b is then secured by the appropriate support materials and the optical target 118 is removed.

A second section of pipe may then be similarly positioned along the predetermined path. The first end of the second pipe is mated with the second end of the first pipe section. The first end of the second pipe section is secured in position with the appropriate support material. The second end of the second pipe section is maneuvered based on the reference light beam until the second section is aligned along the predetermined path. As similarly discussed above regarding the first section of pipe, an optical target may be inserted in the second end of the second section of pipe to facilitate alignment thereof. This procedure is repeated until the pipe line has been completed.

Having thus described the present invention in detail and by reference to preferred embodiments thereof, it will be apparent that modifications and variations are possible without departing from the scope of the invention as defined in the appended claims.

What is claimed is:

1. A pipe alignment system for aligning a section of pipe along a predetermined path, said system comprising:

a light transmitter for transmitting a collimated beam of light along the predetermined path, said beam of light having a wavelength substantially in the green portion of the optical spectrum; and an optical target being adapted to be positioned at one end of said pipe section for visually indicating impingement of said beam of light having a wavelength substantially in the green portion of the optical spectrum, whereby said pipe section can be aligned with said beam of light.

2. The pipe alignment system as recited in claim 1 wherein said light transmitter includes a solid-state laser.

3. The pipe alignment system as recited in claim 2 wherein said solid-state laser is a frequency-doubled solid-state laser.

4. The pipe alignment system as recited in claim 1 wherein said light transmitter includes a gas laser.

5. The pipe alignment system as recited in claim 4 wherein said gas laser is a helium-neon laser.

6. The pipe alignment system as recited in claim 1 wherein said light transmitter includes a semiconductor laser.

7. The pipe alignment system as recited in claim 1 wherein said optical target includes reference indicia thereon for positioning said pipe section.

8. The pipe alignment system as recited in claim 1 wherein said optical target comprises a light diverter for directing a substantial portion of said beam of light in a direction toward a worker's position out of the path of said beam of light.

9. The pipe alignment system as recited in claim 1 wherein said optical target is formed from a substantially transparent material having a green tint such that said material is substantially transparent to light in the green portion of the optical spectrum.

10. The pipe alignment system as recited in claim 1 wherein said optical target is adapted to be inserted into said one end of said pipe section.

11. The pipe alignment system as recited in claim 1 wherein said beam of light comprises light having wavelengths between 510 and 570 nm.

12. A method for positioning a pipe line having at least a first section of pipe along a predetermined path, said first section of pipe having a first end and a second end, said method comprising the steps of:

positioning said first end of said first section of pipe along said predetermined path;

positioning a light transmitter at said first end of said first section of pipe, said light transmitter generating a reference beam of light having wavelengths substantially in the green portion of the optical spectrum and propagating along said predetermined path; and aligning said second end of said first section of pipe in response to said reference beam of light.

13. The method as recited in claim 12 wherein the step of providing a light transmitter comprises the step of providing said reference beam of light having wavelengths between 510 and 570 nm.

14. The method as recited in claim 12 comprising the step of positioning an optical target at said second end of said first section of pipe, said optical target having reference indicia thereon, and wherein said step of aligning said second end of said first section of pipe comprises the step of aligning said reference indicia and said reference beam of light.

15. The method as recited in claim 12 comprising the steps of:

providing a second section of pipe having a first end and a second end;

mating said first end of said second section of pipe with said second end of said first section of pipe; and aligning said second end of said second section of pipe based on said reference beam of light.

16. The method as recited in claim 15 in which the step of aligning said second end of said second section of pipe includes the step of positioning an optical target at said second end of said second section of pipe, said optical target having reference indicia thereon, and wherein said step of aligning said second end of said second section of pipe comprises the step of aligning said reference indicia and said reference beam of light.

17. The method as recited in claim 12 wherein the step of positioning the light transmitter includes the step of providing said light transmitter having a solid-state laser.

18. The method as recited in claim 17 wherein the step of positioning the light transmitter includes the step of providing said light transmitter having a semiconductor laser.

19. The method as recited in claim 12 wherein the step of positioning the light transmitter includes the step of providing said light transmitter having a gas laser.

20. The method as recited in claim 19 wherein the step of providing said light transmitter having a gas laser further comprises the step of providing a helium-neon gas laser.

* * * * *